(12) United States Patent
Misikangas et al.

(10) Patent No.: US 7,196,662 B2
(45) Date of Patent: Mar. 27, 2007

(54) PROBABILISTIC MODEL FOR A POSITIONING TECHNIQUE

(75) Inventors: Pauli Misikangas, Helsinki (FI); Petri Myllymäki, Helsinki (FI)

(73) Assignee: Ekahau Oy, Helsinki (FI)

( * ) Notice: Subject to any disclaimer, the term of this patent is extended or adjusted under 35 U.S.C. 154(b) by 0 days.

(21) Appl. No.: 10/999,140

(22) Filed: Nov. 30, 2004

(65) Prior Publication Data

US 2005/0128139 A1    Jun. 16, 2005

Related U.S. Application Data

(63) Continuation of application No. PCT/FI03/00413, filed on May 27, 2003.

(30) Foreign Application Priority Data

May 31, 2002  (FI) .................................. 20021044

(51) Int. Cl.
*G01S 3/02* (2006.01)
*H04Q 7/20* (2006.01)
(52) U.S. Cl. .................................. 342/451; 455/456.1
(58) Field of Classification Search ............... 342/451; 455/456.1–457
See application file for complete search history.

(56) References Cited

U.S. PATENT DOCUMENTS

| | | | |
|---|---|---|---|
| 6,021,330 A * | 2/2000 | Vannucci | 455/456.2 |
| 6,112,095 A | 8/2000 | Wax et al. | |
| 6,263,208 B1 * | 7/2001 | Chang et al. | 455/456.3 |
| 6,269,246 B1 | 7/2001 | Rao et al. | |
| 6,393,294 B1 | 5/2002 | Perez-Breva et al. | |
| 6,564,065 B1 * | 5/2003 | Chang et al. | 455/457 |
| 6,782,265 B2 | 8/2004 | Perez-Breva et al. | |
| 2003/0087648 A1 * | 5/2003 | Mezhvinsky et al. | 455/456 |
| 2003/0134648 A1 * | 7/2003 | Reed et al. | 455/456 |
| 2003/0176196 A1 * | 9/2003 | Hall et al. | 455/456.1 |
| 2004/0027257 A1 * | 2/2004 | Yannone et al. | 342/42 |
| 2004/0198386 A1 * | 10/2004 | Dupray | 455/456.1 |
| 2005/0131635 A1 * | 6/2005 | Myllymaki et al. | 701/205 |
| 2005/0136944 A1 * | 6/2005 | Misikangas et al. | 455/456.1 |
| 2005/0181804 A1 * | 8/2005 | Misikangas et al. | 455/456.1 |
| 2005/0197139 A1 * | 9/2005 | Misikangas et al. | 455/456.1 |

FOREIGN PATENT DOCUMENTS

JP          07-253446          10/1995

(Continued)

OTHER PUBLICATIONS

English translation of JP 2001313972 A.*

(Continued)

*Primary Examiner*—Thomas H. Tarcza
*Assistant Examiner*—F H Mull
(74) *Attorney, Agent, or Firm*—Pillsbury Winthrop Shaw Pittman LLP

(57) ABSTRACT

A model construction module (MCM) for constructing a probabilistic model (PM) of a wireless environment (RN) in which a target device (T) communicates using signals that have a measurable signal value (x), such as signal strength. The model construction module forms several submodels (611–631) of the wireless environment (RN). Each sub-model indicates a probability distribution ($F_1$–$F_3$) for signal values at one or more locations ($Q_1$–$Q_Y$) in the wireless environment. The module combines the submodels to a probabilistic model (PM) of the wireless environment (RN), such that the probabilistic model indicates a probability distribution for signal values at several locations in the wireless environment. Alternatively, the model may insert new locations to a single model based on a combination of existing locations. The combination of submodels or existing locations includes combining the inverse cumulative distribution functions of the submodels or existing locations.

8 Claims, 3 Drawing Sheets

FOREIGN PATENT DOCUMENTS

| | | |
|---|---|---|
| JP | 10-094040 | 4/1998 |
| JP | 2001-313972 A | 11/2001 |
| RU | 2 183 021 C1 | 5/2002 |
| WO | WO 00/69198 | 11/2000 |
| WO | WO 2004073343 A1 * | 8/2004 |

OTHER PUBLICATIONS

J. Lee et al., Tracking of mobile phone using IMM in CDMA environment, Proceedings of the IEEE International Conference on Acoustics, Speech, and Signal Processing, vol. 5, p. 2829-2832, May 2001.*

X. Lin et al., Enhanced-accuracy GPS navigation using the interacting multiple-model estimator, Proceedings of the SPIE, Signal and Data Processing of Small Targets 2001), vol. 4473(1), p. 234-245, Nov. 2001.*

Japanese Office Action dated Aug. 15, 2006 of Patent Application No. 2004-509450.

Petri Millymaki, et al., "A Probabilistic Approach to WLAN User Location Estimation," The Third IEEE Workshop on Wireless Local Area NEtworks, Sep. 2001.

Moriaki Kiyomoto, et al., "A New Method for Reinforcement Learning with Position Vector in Partially Observable Markov Decision Process", Essay Journals of System Control Infromation Academy, Feb. 2001, vol. 14, No. 2, pp. 86-91.

* cited by examiner

PROBABILISTIC MODEL FOR A POSITIONING TECHNIQUE

This is a continuation of International Application No. PCT/FI03/00413, filed May 27, 2003, which claims priority from Finnish Application No. 20021044, filed May 31, 2002, the contents of both of which are incorporated herein by reference.

BACKGROUND OF THE INVENTION

The invention relates generally to a positioning technique in which a target device's location is estimated on the basis of observations on the target device's wireless communication environment. FIG. 1 schematically illustrates an example of such a positioning technique. A target device T communicates via base stations BS via a radio interface RI. In this example, the communication is assumed to be radio communication. The target device T observes signal values at the radio interface RI. The observation set OS is applied to a probabilistic model PM that models the target device's wireless communication environment and produces a location estimate LE.

A practical example of the target device is a data processing device communicating in a wireless local-area network (WLAN) or a cellular radio network. The data processing device may be a general-purpose laptop or palmtop computer or a communication device, or it may be a dedicated test or measurement apparatus such as a hospital instrument connected to the WLAN. A signal value, as used herein, is a measurable and location-dependent quantity of a fixed transmitter's signal. For example, signal strength and bit error rate/ratio are examples or measurable and location-dependent quantities. An example of a positioning technique that is based on a probabilistic model of a device's radio environment is disclosed in U.S. Pat. No. 6,112,095 to Mati Wax et al.

A problem underlying the invention is related to the fact that such a probabilistic model works best when it is dense. This means that the distance between sample points should not be too high. A sample point is a point of the probabilistic model. In an ideal case, the distance between sample points is equal to the desired resolution of the probabilistic model, which means that the sample point that best matches the target device's observations is considered to be the target device's location. A problem is that obtaining a large number of sample points by physical calibration is time-consuming and expensive. This process is difficult to perform automatically. As a result, some sample points should be determined by deriving them from known calibrated locations, for example, by interpolation. But, surprisingly, such interpolation is far from trivial.

FIG. 2 illustrates a problem related to interpolation of signal values. The independent variable x represents a measurable signal value, such as signal strength. The dependent variable P(x) is the probability of that signal value. FIG. 2 shows probability distributions 21 and 22 for two locations $Q_1$ and $Q_2$, respectively. To keep FIG. 2 simple, the probability distributions 21 and 22 are assumed to be non-overlapping. The signal values for location $Q_1$ are concentrated near value $X_1$ and the signal values for location $Q_2$ are concentrated near value $X_2$.

Assume that we wish to predict signal values at a sample point that is between the locations $Q_1$ and $Q_2$. For example, we might wish to insert into the probabilistic model a sample point that is between two locations for which actual measurements or simulation results are available. An intuitive way to create such a new sample point is to combine the probability distributions 21 and 22 for locations $Q_1$ and $Q_2$. Curve 23, that is shown in a bold dash line, represents such a combined (and normalized) probability distribution. But such a combined probability distribution 23 does not predict signal values between two locations, at least not very well. This is because the combined probability distribution 23 has nonzero probability values only for signal values that have nonzero probabilities in either of the original probability distributions 21 and 22. Accordingly, the intuitive way to combine the probability distributions 21 and 22 produces a result which is counter-intuitive and apparently false. In FIG. 2, the signal value is quantified to discrete values, but the result is the same if x is treated as a continuous variable.

Thus a problem is how to create a sample point based on interpolation of two or more known locations. This problem can be generalized as follows: how to construct a probabilistic model that models a target device's wireless environment for positioning the target device, such that the probabilistic model can be constructed on the basis of diverse information. The model may be based on calibration measurements, simulations or theoretical calculations or any combination thereof. The model should be generic enough to be able to make best possible use of any information available.

BRIEF DESCRIPTION OF THE INVENTION

An object of the invention is to provide a method and an apparatus for implementing the method so as to provide a solution to the above-specified problem. In other words, it is an object of the invention to provide a probabilistic model for a positioning technique such that the probabilistic model can accept and combine information from a variety of sources. Such information may be calibration measurements, simulations or theoretical calculations or any combination thereof. The calibration measurements may have been made at different times, and a probabilistic model according to the invention should be able to combine such information in a sensible manner, instead of merely replacing old measurements with new ones. The object of the invention is achieved by the methods and equipment which are characterized by what is stated in the independent claims. The preferred embodiments of the invention are disclosed in the dependent claims.

The invention is based on the idea of forming a probabilistic model based on simpler submodels or calibration measurements such that the probabilistic model indicates a probability distribution for signal values at several locations in the wireless environment. A preferred embodiment of the invention accomplishes the combination by combining the inverse cumulative distribution functions of expected signal values. Persons with any knowledge of probability theory will understand that many mathematically equivalent techniques can be used, such as combining the cumulative distribution functions (instead of inverse cumulative distribution functions) and swapping the x and y axis. A benefit of the invention is that a combination of the inverse cumulative distribution functions results in a probabilistic model that much better predicts signal values than does a model based on combining the expected signal values themselves or their probability distributions. For example, the invention can be used to add new sample points to the probabilistic model based on two or more locations for which calibration measurements or calculation or simulation results exist.

Such a creation of new sample points based on existing calibration points can be called interpolation or extrapolation, depending on whether the added sample point is within or outside a line or area bounded by the existing calibration points. Such an interpolation or extrapolation in respect of locations can be called spatial interpolation or extrapolation. In addition, the invention can be used for temporal interpolation or extrapolation. That is, a new probabilistic model can be created by combining two or more earlier probabilistic models. A practical example of temporal interpolation or extrapolation is that an updated probabilistic model is not only based on the most recent measurements (or calculation or simulation results) but a combination of the most recent and earlier information. Yet further, the invention can be used to combine different types of probabilistic models. A probabilistic model created by a technique according to the invention can be based on several types of information, including actual calibration measurements and the results of simulations or theoretical calculations, or any combination thereof. Interpolated or extrapolated sample points can be created based on measured or calculated sample points. The interpolation or extrapolation can be spatial and/or temporal.

An aspect of the invention is a method for estimating a target device's location, wherein the target device is operable to move in a wireless environment and to communicate with the wireless environment using signals each of which has at least one measurable signal value. The method comprises:
a) forming a plurality of submodels of the wireless environment, each submodel indicating a probability distribution for signal values at one or more locations in the wireless environment;
b) combining the submodels to a probabilistic model of the wireless environment, the probabilistic model indicating a probability distribution for signal values at several locations in the wireless environment;
c) making a set of observations of signal values in the wireless environment at the target device's location; and
d) estimating the target device's location based on the probabilistic model and the set of observations.

Another aspect of the invention is a method that comprises the steps of:
a) forming probabilistic model of the wireless environment, the probabilistic model indicating a probability distribution for signal values at several locations in the wireless environment;
b) inserting into the probabilistic model a probability distribution for a new location, wherein the inserting step comprises combining probability distributions for existing locations;
c) making a set of observations of signal values in the wireless environment at the target device's location; and
d) estimating the target device's location based on the probabilistic model and the set of observations.

The location-estimating step can be performed in the target device. In this case, the target device must comprise the probabilistic model and carry out the location-estimating software routines. An advantage gained by performing the location-estimating step in the target device is that the target device does not have to transmit the signal value observations to have its location estimated.

Alternatively, the location-estimating step can be performed in an external location-estimating apparatus to which the target device reports the sequence of observations via a radio network. An advantage of this embodiment is that the target device does not have to comprise the probabilistic model or the location-estimating routines. However, it must send its observations to an external location-estimating apparatus.

The measurable signal values preferably comprises signal strength. Alternatively, or in addition to signal strength, the measurable signal values may comprise bit error rate/ratio or signal-to-noise ratio.

Yet another aspect of the invention is a model construction module for constructing a probabilistic model of a wireless environment in which a target device is operable to communicate using signals each of which has at least one measurable signal value. The model construction module has software code portions for performing steps a) and b) of the first method.

Yet another aspect of the invention is a model construction module for performing steps a) and b) of the second method.

BRIEF DESCRIPTION OF THE DRAWINGS

In the following the invention will be described in greater detail by means of preferred embodiments with reference to the attached drawings, in which FIG. 1 schematically illustrates a positioning technique.

DETAILED DESCRIPTION OF PREFERRED EMBODIMENTS

Figure 1:
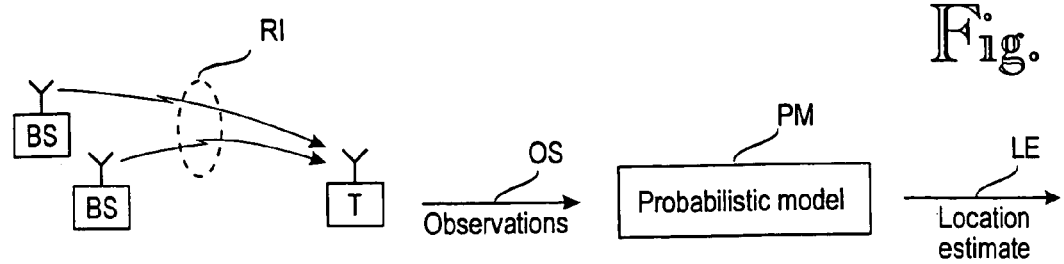
Figure 2:
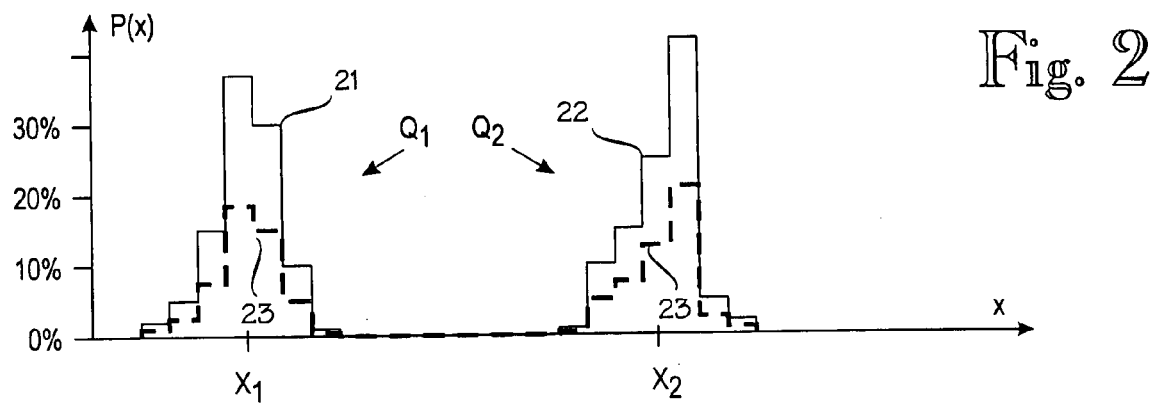
FIG. 2 illustrates the problem underlying the invention.
Figure 3:
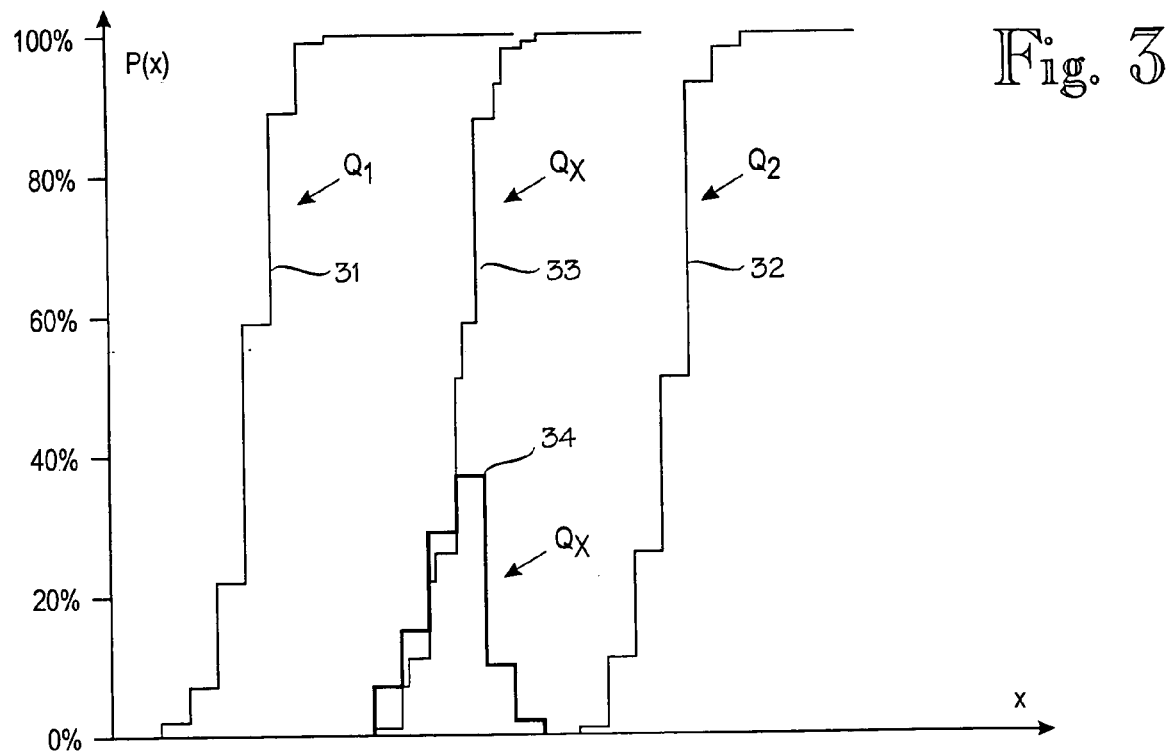
FIG. 3 shows the principle of the invention.

FIG. 3 illustrates the principle of the invention. The invention is based on the idea of combining the inverse cumulative distribution functions of expected signal values at various locations, instead of combining the signal values or their probability distributions. FIG. 3 is drawn to the same scale as FIG. 2, and the x-axis are aligned. Curve 31 represents the cumulative distribution function for location $Q_1$. For each nonzero probability value in probability distribution 21, there is a corresponding step in the cumulative distribution function 31. Similarly, curve 32 represents the cumulative distribution function for location $Q_2$. Curve 33 is a cumulative distribution function for a location $Q_X$ (such as a new sample point) between locations $Q_1$ and $Q_2$. In this example, the new sample point $Q_X$ is assumed to be in the middle of a straight line from $Q_1$ to $Q_2$, and the cumulative distribution function 33 is created by the following algorithm: for each of several dependent variable values P(x), the independent variable value x is determined by weighting with equal weights the cumulative distribution functions 31 and 32 of the locations $Q_1$ and $Q_2$, respectively.

Curve 34 is the expected probability distribution for the new location (sample point) $Q_X$. Curve 34 is aligned with curves 21 and 22, and intuitively it seems that the probability distribution 34 predicts signal values at $Q_4$ much better than does the probability distribution 23 shown in FIG. 2, because the signal values with nonzero probabilities are somewhere between the signal values $X_1$ and $X_2$, instead of being near either of these values.

Figure 4:
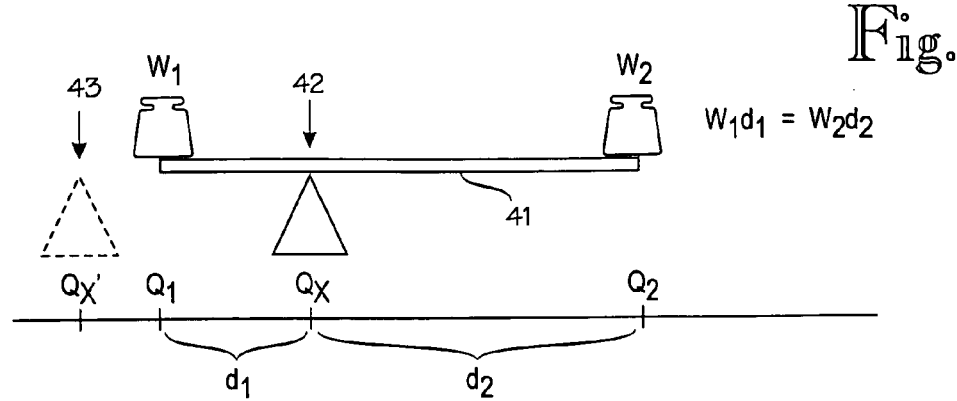
FIGS. 4 and 5 illustrate interpolation in one or two dimensions, respectively.
Figure 5:
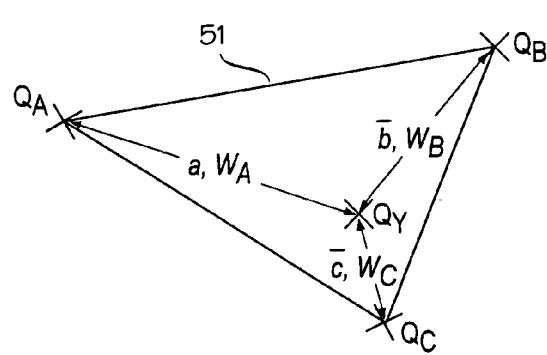

In FIG. 3, location $Q_X$ (such as a new sample point) was assumed to be in the middle of a straight line from $Q_1$ to $Q_2$. If this assumption is not valid, the cumulative distribution function 33 for location $Q_X$ can be determined by distance-weighting the cumulative distribution functions 31 and 32 of the locations $Q_1$ and $Q_2$ depending on the relative distances from $Q_1$ to $Q_X$ and from $Q_X$ to $Q_2$. FIGS. 4 and 5 illustrate such distance-weighting.

FIG. 4 illustrates interpolation along one dimension. $Q_1$, $Q_2$ and $Q_X$ are three locations such that $d_1$ is the distance from $Q_1$ to $Q_X$ and $d_2$ is the distance from $Q_X$ to $Q_2$. Ideally, the weights $W_1$ and $W_2$ for the cumulative distribution functions for locations $Q_1$ and $Q_2$ should be selected such that $W_1 d_1 = W_2 d_2$. This weighting is illustrated by a horizontal bar 41 whose ends are at $Q_1$ and $Q_2$ and the bar is pivoted at $Q_X$ (at reference numeral 42). The bar is balanced if the weights $W_1$ and $W_2$ are inversely related to the distances $d_1$ and $d_2$. Because the weights and distances are inversely related, this weighting can be called inverse distance-weighting.

In addition to interpolation, the balanced-bar analogy can be used with linear extrapolation as well. Assume an extrapolated location $Q_X'$, for which a pivot point 43 for the balanced bar is shown with a dashed line. The bar 41 can still be balanced by using negative weights. Naturally, extrapolation is not reliable with large distances.

FIG. 5 illustrates interpolation in two dimensions. On the basis of three known locations $Q_A$, $Q_B$ and $Q_C$, we wish to predict signal values for a new location $Q_Y$. First the cumulative distribution functions for each of the known locations $Q_A$, $Q_B$ and $Q_C$ are determined as shown in connection with FIG. 3. Then an imaginary triangle is drawn such that its apexes are at the known locations $Q_A$, $Q_B$ and $Q_C$. The imaginary triangle is pivoted at the new location $Q_Y$. Finally, weights for the known locations $Q_A$, $Q_B$ and $Q_C$ (the apexes of the imaginary triangle) are selected such that the triangle is balanced. (In FIGS. 4 and 5, the bar 41 and triangle 51 are assumed weightless.)

In general, the weights can be determined using vectors. Let $\bar{a}$ be a vector from $Q_Y$ to $Q_A$, $\bar{b}$ a vector from $Q_Y$ to $Q_B$ and $\bar{c}$ a vector from $Q_Y$ to $Q_C$. The weights $w_A$, $w_B$ and $w_C$ for locations $Q_A$, $Q_B$ and $Q_C$ can be obtained by solving the following pair of equations:

$$w_A \cdot \bar{a} + w_B \cdot \bar{b} + w_C \cdot \bar{c} = \bar{0} \quad [1]$$

$$w_A + w_B + w_C = 1 \quad [2]$$

In this 2-dimensional example, the solution can be found easily by noting that the first equation is true only if the weighted sum of x-coordinates of the vectors is zero as well as is the weighted sum of y-coordinates. Thus, the weights are obtained as the only solution of the following equation group:

$$w_A \cdot a_x + w_B \cdot b_x + w_C \cdot c_x = 0 \quad [3]$$

$$w_A \cdot a_y + w_B \cdot b_y + w_C \cdot c_y = 0 \quad [4]$$

$$w_A + w_B + w_C = 1 \quad [5]$$

The method can be generalized for N-dimensional space. Let $\bar{v_1}, \bar{v_2}, \ldots, \bar{v_{N+1}}$ be the vectors and $w_1, w_2, \ldots, w_{N+1}$ be the weights of the vectors. Note that exactly N+1 vectors are needed to make the weights solvable. Now, the weights are obtained as the only solution to the following pair of equations:

$$\sum_{i=1}^{N+1} w_i \cdot \bar{v_i} = \bar{0} \quad [6]$$

$$\sum_{i=1}^{N+1} w_i = 1 \quad [7]$$

If a new location is formed on the basis of more than three known locations, the area can be triangulated. For example, Delaunay triangulation can be used, in which case the apexes of the triangles are at the known locations. For each new location, the triangle that either covers the new location (interpolation) or is closest to the new location (extrapolation) is selected.

The technique of combining weighted cumulative distribution functions is very generic. This technique can be used to:
1. interpolate or extrapolate from known locations (physically calibrated calibration points or simulated or calculated locations);
2. combine models of different age (instead of merely replacing old data with new); and
3. combine models of different type, such as models based on physical calibration and models based on simulation or theoretical calculations.

The generic nature of the technique suggests a novel interpretation for a model. Instead of having one single model that has several sample points, each of several models can have only one sample point (calibrated, simulated or calculated), and the models are then combined by combining their weighted cumulative distribution functions. From this point on, the term probabilistic model refers to the result of the combination, and the models on the basis of which the probabilistic model is formed are called submodels. Note that a probabilistic model itself can act as a submodel for an updated probabilistic model.

Formally, a probabilistic model can be expressed as follows:

$$P(q|o) \propto P(o|q) P(q) \quad [8]$$

where o denotes an observation (vector) and q is a location. If the prior probability distribution $P(q)$ is assumed to be uniform (giving equal prior probability for all the locations q), then we can see that the probability for a location q is proportional to the probability that the model gives for the observation o at location q. In other words, we can obtain a probability distribution for a set of locations q by first computing the probability of our observation o at each location, and then by normalizing the resulting probabilities so that they sum up to one. This means that the only thing we need to determine are the conditional probability distributions $P(o|q)$ at each location q. One possibility for determining these probability distributions is to assume the individual signal value observations $o_i$ to be independent given the location q, in which case the individual signal value probabilities are combined by simply multiplying them as follows:

$$P(o|q) = \prod_{i=1}^{n} P(o_i|q) \quad [9]$$

In the real world, the signal value is a virtually continuous variable, and the probability for any given signal value is infinitesimal. Accordingly, the probability for a signal value range $[o_i-\epsilon, o_i+\epsilon]$ should be used:

$$P([o_i-\epsilon, o_i+\epsilon]|q)=F(o_i+\epsilon|q)-F(o_i-\epsilon|q) \quad [10]$$

wherein F is the cumulative distribution function and $\epsilon$ is a small constant.

Figure 6:
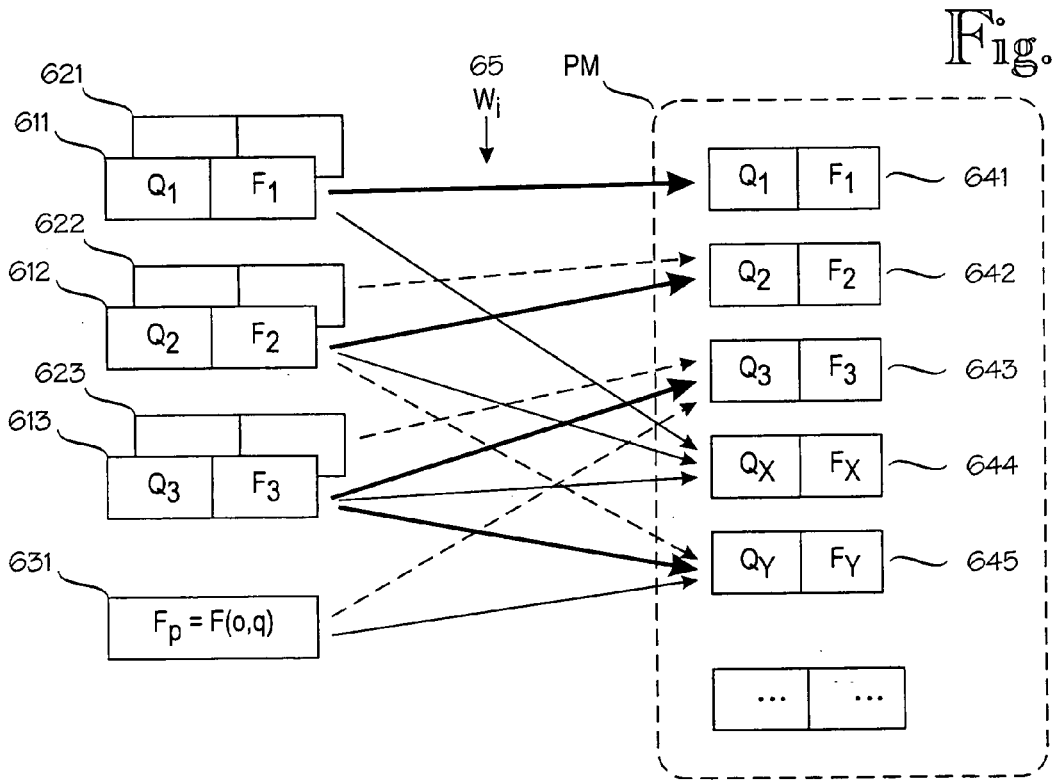
FIG. 6 illustrates a probabilistic model PM that is the result of a combination of different submodels.

FIG. 6 illustrates a probabilistic model PM that is the result of such a combination of submodels. FIG. 6 shows submodels of two different types. The first type is a calibration submodel. This submodel is based on physical calibration measurements. The second type is a propagation submodel and is based on modelling the wireless communication environment by simulations or calculations. Propagation submodels require very good knowledge of the communication environment and the placement and properties of the base stations. A propagation submodel can be created by a technique analogous to visualizations based on ray-tracing. Lamps are replaced by base stations, light-related properties (such as reflection or retraction) are replaced by properties related to radio signals, etc. Constructing a propagation submodel is time-consuming, but once created, the model can produce a number of sample points without physical measurements. On the other hand, calibration measurements require no knowledge of the environment or the base stations, and the measurements are relatively simple, but they must be performed at small intervals and repeated frequently.

Because the inventive technique supports combining many different submodels, the calculations can be simplified by assigning a submodel to each calibrated location. Reference numerals 611 to 613 denote three such calibration submodels. Each of the calibration submodels 611 to 613, by itself, is very simplistic. For example, submodel 611 says that if $F_1$ is the best match for a signal value's observed probability distribution, then the target device is located at location $Q_1$. Each of the calibration submodels 611 to 613 can be formally expressed by a formula:

$$F_C(o|q)=F_A(o) \quad [11]$$

in which F is the cumulative distribution function of a signal value, o is an observation, q is a location and A is the area covered by the submodel. The areas A can be selected such that a submodel based on $Q_i$ covers the entire area for which location $Q_i$ is the closest calibrated location. In plain language, equation 11 says the function F is not a function of location q after all but constant over the entire area A. Reference numerals 621 to 623 denote older versions of the calibration submodels 611 to 613.

Reference numeral 631 denotes a propagation model. A propagation model can be formally expressed by a formula:

$$F_P=F(o|q) \quad [12]$$

Equation 12 means that the function $F_P$ for a propagation model is location-dependent, that is, a function of location q. The function $F(o|q)$ can be a discrete function, which means that the function values are calculated for several sample points, or it can be a continuous function. A continuous function can be formed by fitting a polynomial, spline or other suitable curve to the calculated sample points.

The different models 611 to 631 can be combined by using the following equation:

$$F_{PM}^{-1}(o|q) = \frac{\sum_{i=1}^{N} F_i^{-1}(o|q) \cdot W_i(q)}{\sum_{i=1}^{N} W_i(q)} \quad [13]$$

In equation 13, N is the number of submodels, $F_i^{-1}$ is the inverse function of the function F of submodel i, and $W_i(q)$ is the weight assigned to submodel i at location q. Thus the weights depend on location, as described in connection with FIGS. 4 and 5. In plain language, equation 13 means that the inverse function of the probabilistic model, namely $F_{PM}^{-1}$, can be calculated by weighting and summing the inverse function $F_i^{-1}$ of the function $F_i$ of each submodel i. Then the weighted sum is normalized by dividing with the sum of weights $W_i(q)$. The function $F_{PM}$ for the probabilistic model PM is calculated by taking the inverse of the inverse function $F_{PM}^{-1}$. The calculation of equation 13 should be repeated for each channel. It should also be repeated for each signal value type, such as signal strength, bit error rate/ratio, signal-to-noise ratio, etc.

The probabilistic model PM shown in FIG. 6 comprises a function F (probability distribution) for several sample points, of which five are shown, namely $Q_1$, $Q_2$, $Q_3$, $Q_X$ and $Q_Y$. Reference numerals 641 to 645 denote five pairs of a sample point $Q_i$ and corresponding function $F_i$ at that point. In this example, sample points $Q_1$, $Q_2$, and $Q_3$ are calibrated locations, that is, there is a respective calibration submodel 611 to 613. Sample points $Q_X$ and $Q_Y$ are points for which actual calibration measurements are not available, and the corresponding functions $F_X$ and $F_Y$ are derived by interpolation/extrapolation from the calibration submodels 611 to 623 and/or from the propagation model 631.

Equation 13 is calculated for each of the sample points 641 to 645 in the probabilistic model. What remains to be done is assigning the relative weights $W_i$. Because equation 13 is normalized, the absolute values of the weights are immaterial; it is the relative weights that matter. Reference numeral 65 generally denotes the weights $W_i$. Four different weights are shown schematically. A thick arrow represents a large weight, a thin arrow represents a medium weight and a dashed arrow represents a small weight. A missing arrow means a zero weight. The weights are selected on the basis of some confidence level, wherein the confidence level is a measure of the capability of the submodel to predict the function $F_i$ at that sample point. For example, reference 641 denotes function $F_1$ for sample point $Q_1$. In this example, because a calibration submodel 611 exists for sample point $Q_1$, and the submodel 611 is assumed to be very recent, the confidence level of submodel 611 is high, and the function $F_1$ for sample point $Q_1$ is determined only on the basis of the submodel 611. Reference 642 denotes function $F_2$ for sample point $Q_2$. Here the assumption is that the most recent calibration submodel 612 has a large weight and the previous calibration submodel 622 has a small weight. Reference 643 denotes function $F_3$ for sample point $Q_3$. Function $F_3$ is strongly influenced by the corresponding submodel 613 and weakly influenced by the previous calibration submodel 623. It is also weakly influenced by the propagation model 631.

Reference numerals 644 and 645 respectively denote sample points $Q_X$ and $Q_Y$ for which actual calibration measurements are not available. In this example, sample point $Q_X$ (reference 644) is determined solely by interpolation on the basis of the three calibration submodels 611 to 613.

Sample point $Q_X$ is assumed substantially equidistant from the calibrated locations $Q_1$, $Q_2$, and $Q_3$, and the relative weights are approximately equal. Sample point $Q_Y$ (reference 645) is assumed to be near $Q_3$, and the relative weight is strong, but the corresponding function $F_Y$ is also influenced by the propagation model 631 and the calibration submodel 612 for location $Q_2$.

Figure 7:
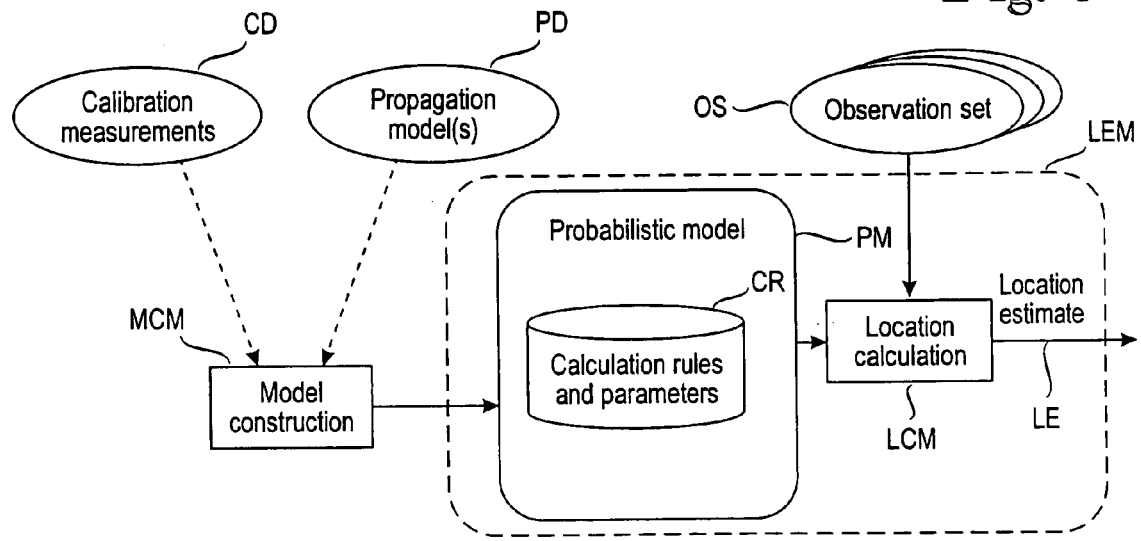
FIG. 7 shows a location estimation module LEM for estimating the target device's location based on signal values at the radio interface RI.

FIG. 7 is a block diagram of an exemplary location estimation module LEM for estimating the target device's location based on signal values at the radio interface RI. FIG. 7 shows a compact location estimation module LEM, but more distributed embodiments are equally possible. An essential feature of the location estimation module is a probabilistic model PM of the target device's wireless environment, the probabilistic model being able to predict the target device's location given a plurality of observations from the radio interface. In this example, the probabilistic model PM is built and maintained by a model construction module MCM. The model construction module MCM builds and maintains the probabilistic model on the basis of calibration data CD or propagation data PD in the form of one or more propagation models, or any combination thereof. Calibration data CD is the result of physically measuring signal values at known locations (or determining the coordinates of those locations if they are not known by other means). Optionally, the calibration data records may also comprise the time at which the measurement was made, in case the signal parameters vary with time. Instead of the calibration data CD, or in addition to them, one or more propagation models PD can be used to model the radio interface RI. The propagation models can be constructed by techniques that are analogous to ray-tracing techniques for visual simulation. The locations at which calibration measurements are collected are called calibration points. The calibration data CD comprises data records each of which comprises the location of the calibration point in question and the set of signal parameters measured at that calibration point. The location can be expressed in any absolute or relative coordinate system. In special cases, such as trains, highways, tunnels, waterways or the like, a single coordinate may be sufficient, but normally two or three co-ordinates will be used.

There is also a location calculation module LCM for producing a location estimate LE on the basis of the target device's observation set OS and the probabilistic model PM. For instance, the location calculation module can be implemented as a software program being executed in a laptop or palmtop computer. Technically, the 'measurements' and 'observations' can be performed similarly, but to avoid confusion, the term 'measurement' is generally used for the calibration measurements, and the signal parameters obtained at the current location of the target device are called 'observations'. The target device's most recent set of observations is called current observations.

Figure 8A:
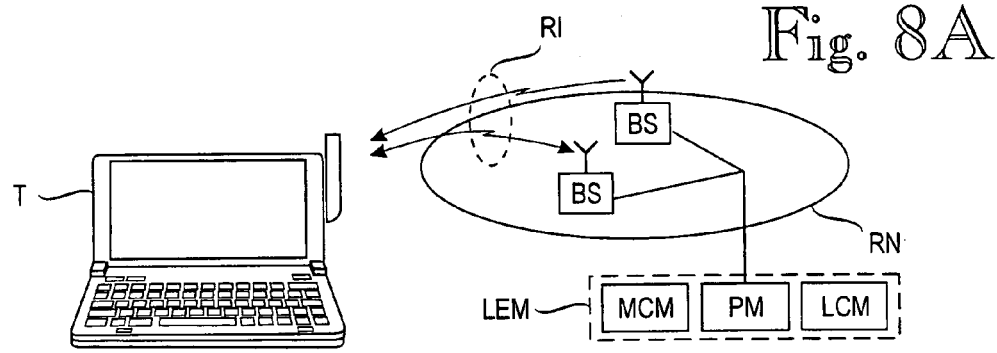
FIGS. 8A and 8B are block diagrams illustrating typical target devices whose location is to be determined.

FIG. 8A is a block diagram illustrating a typical target device T whose location is to be determined. In this example, the target device T is shown as a portable computer that communicates via a radio network RN. For example, the radio network can be WLAN (wireless local-area network) network. In the embodiment shown in FIG. 8A, the location estimation module LEM comprising the probabilistic model PM is not installed in the target device T. As a result, the target device T must send its observation set OS to the location estimation module LEM via one or more of the base station BS it is connected to. The location estimation module LEM returns the target device its location estimate LE via the radio interface RI.

Figure 8B:
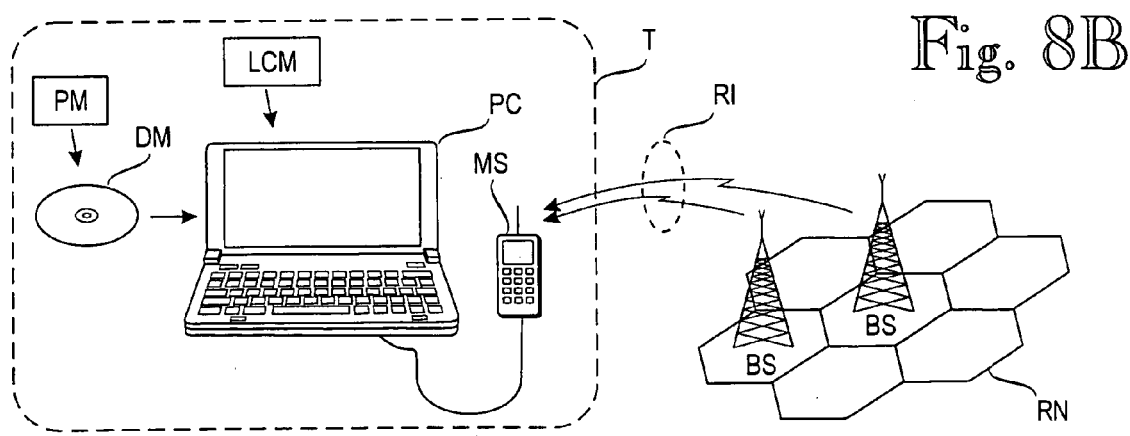

FIG. 8B shows an alternative embodiment in which the target device's attached computer PC receives a copy of the probabilistic model PM on a detachable memory DM, such as a CD-ROM disk, and the target device T is able to determine its own location without transmitting anything. As a yet further alternative (not shown separately), the attached computer PC may receive the probabilistic model via an Internet (or any other data) connection to the location estimation module LEM. Wideband mobile stations can receive the probabilistic model via the radio interface RI. A hybrid of the technologies may also be used such that the receiver receives an initial probabilistic model via a wired connection or on the detachable memory, but later updates to the model are sent via the radio interface.

It is readily apparent to a person skilled in the art that, as the technology advances, the inventive concept can be implemented in various ways. The invention and its embodiments are not limited to the examples described above but may vary within the scope of the claims.

The invention claimed is:

1. A method for estimating a target device's location, wherein the target device is operable to move in a wireless environment and to communicate with the wireless environment using signals each of which has at least one measurable signal value, the method comprising:
   forming a plurality of submodels of the wireless environment, each submodel indicating a probability distribution for signal values at one or more locations in the wireless environment;
   combining the submodels to provide a probabilistic model of the wireless environment, the probabilistic model indicating a probability distribution for signal values at several locations in the wireless environment;
   making a set of observations of signal values in the wireless environment at the target device's location; and
   estimating the target device's location based on the probabilistic model and the set of observations,
   wherein the combining of the submodels comprises:
      for each submodel, forming a cumulative distribution function and weighting the cumulative distribution function with a relative weight;
      forming a combination of the weighted cumulative distribution functions; and
      forming the probability distribution for the probabilistic model based on the combination of the weighted cumulative distribution functions.

2. A method according to claim 1, wherein the plurality of submodels comprises a plurality of calibration submodels such that each calibration submodel relates to exactly one calibrated location.

3. A method according to claim 2, further comprising:
   inserting into the probabilistic model sample, points for which calibration measurements are not available, by interpolating or extrapolating based on two or more calibrated locations; and
   assigning a relative weight to each calibrated location based on the inserted sample point's distance from the calibrated location such that the relative weight and distance are in inverse relationship to each other.

4. A method according to claim 1, wherein the plurality of submodels comprises at least one propagation model.

5. A method according to claim 1, wherein the location-estimating is performed in the target device.

6. A method according to claim 1, wherein the location-estimating is performed in a fixed equipment to which the target device reports the sequence of observations via a radio network.

7. A method according to claim 1, wherein the at least one measurable signal value comprises signal strength.

8. A method according to claim 1, wherein the at least one measurable signal value comprises bit error rate or ratio.

* * * * *